United States Patent
Park et al.

(10) Patent No.: US 9,902,275 B2
(45) Date of Patent: Feb. 27, 2018

(54) METHOD AND DEVICE FOR RECIPROCALLY SUPPLYING ELECTRICITY BETWEEN ELECTRIC VEHICLE AND OTHER VEHICLE

(71) Applicant: Hanwha Techwin Co., Ltd., Changwon-si (KR)

(72) Inventors: SungEun Park, Changwon-si (KR); Heeseo Chae, Changwon-si (KR)

(73) Assignee: HANWHA LAND SYSTEMS CO., LTD., Changwon-si (KR)

( * ) Notice: Subject to any disclaimer, the term of this patent is extended or adjusted under 35 U.S.C. 154(b) by 0 days.

(21) Appl. No.: 15/102,897

(22) PCT Filed: Dec. 17, 2013

(86) PCT No.: PCT/KR2013/011699
§ 371 (c)(1),
(2) Date: Jun. 9, 2016

(87) PCT Pub. No.: WO2015/088084
PCT Pub. Date: Jun. 18, 2015

(65) Prior Publication Data
US 2016/0303986 A1   Oct. 20, 2016

(30) Foreign Application Priority Data

Dec. 9, 2013  (KR) .................. 10-2013-0152645

(51) Int. Cl.
*B60L 11/00*   (2006.01)
*B60W 10/00*   (2006.01)
(Continued)

(52) U.S. Cl.
CPC ........... *B60L 11/1811* (2013.01); *B60L 11/18* (2013.01); *B60L 11/1861* (2013.01);
(Continued)

(58) Field of Classification Search
CPC ....... B60L 11/00; B60W 10/00; B60W 20/00; B60W 30/00; H02J 7/00
See application file for complete search history.

(56) References Cited

U.S. PATENT DOCUMENTS 8,400,107 B2 * 3/2013 Taguchi .............. B60L 11/1816
320/109
2011/0175569 A1 * 7/2011 Austin ................ B60L 11/1824
320/109
(Continued)

FOREIGN PATENT DOCUMENTS

JP   2007-252118 A   9/2007
JP   2010-035333 A   2/2010
(Continued)

OTHER PUBLICATIONS

International Search Report for PCT/KR2013/011699 dated Sep. 3, 2014 [PCT/ISA/210].
(Continued)

*Primary Examiner* — Yonel Beaulieu
(74) *Attorney, Agent, or Firm* — Sughrue Mion, PLLC

(57) ABSTRACT

Provided is an electric vehicle capable of reciprocally supplying electricity with another vehicle which includes: a power connector; a communication connector; a DC/DC converter used for charging or discharging an internal battery pack; a charging relay for preventing an inrush current during charging; and a display. While moving at the same speed as the other vehicle, the electric vehicle is capable of performing charging or discharging when a connection is maintained between a power connector of the other vehicle and the power connector of the electric vehicle.

20 Claims, 7 Drawing Sheets

(51) Int. Cl.
*B60W 20/00* (2016.01)
*B60W 30/00* (2006.01)
*H02J 7/00* (2006.01)
*B60L 11/18* (2006.01)
*B60W 10/30* (2006.01)
*B60W 30/16* (2012.01)

(52) U.S. Cl.
CPC ............ *B60W 10/30* (2013.01); *B60W 20/00* (2013.01); *B60W 30/16* (2013.01); *H02J 7/0047* (2013.01); *H02J 7/0054* (2013.01); *H02J 7/0077* (2013.01); *B60L 2210/10* (2013.01); *B60L 2240/12* (2013.01); *B60L 2240/62* (2013.01); *B60Y 2200/91* (2013.01); *B60Y 2400/21* (2013.01); *B60Y 2400/92* (2013.01); *Y10S 903/907* (2013.01)

(56) References Cited

U.S. PATENT DOCUMENTS

2011/0254377 A1  10/2011  Wildmer et al.
2013/0169212 A1   7/2013  Sun et al.

FOREIGN PATENT DOCUMENTS

| JP | 2010-187466 A | 8/2010 |
| JP | 2013-236490 A | 11/2013 |
| KR | 10-2010-0104728 A | 9/2010 |
| KR | 10-2013-0042483 A | 4/2013 |
| KR | 10-2013-0078106 A | 7/2013 |
| KR | 10-2013-0078386 A | 7/2013 |
| WO | 2013/100559 A1 | 7/2013 |

OTHER PUBLICATIONS

Written Opinion for PCT/KR2013/011699 dated Sep. 3, 2014 [PCT/ISA/237].

* cited by examiner

METHOD AND DEVICE FOR RECIPROCALLY SUPPLYING ELECTRICITY BETWEEN ELECTRIC VEHICLE AND OTHER VEHICLE

CROSS-REFERENCE TO RELATED APPLICATION

This is a National Stage Entry of International Application No. PCT/KR2013/011699 filed on Dec. 17, 2013, claiming priority based on Korean Patent Application No. 10-2013-0152645 filed on Dec. 9, 2013, the contents of all of which are incorporated herein by reference in their entirety.

TECHNICAL FIELD

The present inventive concept relates to a method of reciprocally supplying electricity between two apparatuses, and more particularly, to a method of supplying electricity between electric vehicles, between an electric vehicle and a movable robot, or between movable robots.

BACKGROUND ART

Vehicles driven by engines include a lot of components, for example, engines, transmission, drive shafts, hydraulic brakes, and engine-related parts such as fuel supply apparatuses, air injection and exhaust apparatuses, cooling and lubrication apparatuses, and anti-vibration apparatuses. Also, the vehicles have many problems including air contamination due to an exhaust gas. To address this problem, vehicles equipped with electric motors, hydrogen vehicles, or next-generation vehicles using fuel cells or solar energy are under development However, in the case of electric vehicles, a charging infrastructure has not yet been sufficiently established and thus there is a problem that a solution to enable street charging when a battery charge amount is low during driving has not been separately provided. Thus, there is no method to deal with an emergency situation when electricity of an electric vehicle is discharged.

PRIOR ART DOCUMENT

Patent Document

KR 2013-0078386

DETAILED DESCRIPTION OF THE INVENTION

Technical Problem

The present inventive concept provides a method in which an electric vehicle receives electricity from another vehicle.

Technical Solution

According to an aspect of the present inventive concept, there is provided an electric vehicle for mutually supplying electricity with respect to an external vehicle, which includes a power connector supplying electricity to the external vehicle or receiving electricity from the external vehicle, a communication connector performing communication with the external vehicle, a DC/DC converter performing charging or discharging an inner battery pack, a charging relay preventing an inrush current during charging, a controller controlling whether the DC/DC converter performs charging or discharging, when the power connector of the electric vehicle is connected to a power connector of the external vehicle, and a display displaying a charging progress, in which, when charging or discharging is performed between the electric vehicle and the external vehicle which drive end to end, maintaining a state in which the power connector of the electric vehicle is connected to the power connector of the external vehicle, the controller calculates in real time a distance between a preceding vehicle and a following vehicle, which is performed by the following vehicle that is either the electric vehicle or the external vehicle, so as to control the distance between the preceding vehicle and the following vehicle to be maintained constant.

According to another aspect of the present inventive concept, there is provided an electric vehicle for mutually supplying electricity with respect to an external vehicle, which includes a power connector supplying electricity to the external vehicle or receiving electricity from the external vehicle, a communication connector performing communication with the external vehicle, a DC/DC converter performing charging or discharging of an inner battery pack, a charging relay preventing an inrush current during charging, a controller controlling whether the DC/DC converter performs charging or discharging, when the power connector of the electric vehicle is connected to a power connector of the external vehicle, and a display displaying a charging progress, in which, when charging or discharging is performed between the electric vehicle and the external vehicle which drive side by side, maintaining a state in which the power connector of the electric vehicle is connected to the power connector of the external vehicle, the controller calculates an intermediate value of a speed of the electric vehicle and a speed of the external vehicle and then controls a vehicle having a speed faster than the intermediate value to be decelerated and a vehicle having a speed slower than the intermediate value to be accelerated.

According to another aspect of the present inventive concept, there is provided an electric vehicle for mutually supplying electricity with respect to an external vehicle, which includes a power connector supplying electricity to the external vehicle or receiving electricity from the external vehicle, a communication connector performing communication with the external vehicle, a DC/DC converter performing charging or discharging of an inner battery pack, a charging relay preventing an inrush current during charging, a controller controlling whether the DC/DC converter performs charging or discharging, when the power connector of the electric vehicle is connected to a power connector of the external vehicle, and a display displaying a charging progress, in which charging or discharging is performed between the electric vehicle and the external vehicle, which drive at a same speed, maintaining a state in which the power connector of the electric vehicle is connected to the power connector of the external vehicle.

The controller may provide, on the display, a control interface for controlling charging with the external vehicle, and the control interface may provide at least one of a state of charge (SoC) mode for adjusting a charging state of the external vehicle, a constant voltage (CV) mode for adjusting a voltage difference between an inner battery pack of the electric vehicle and an inner battery pack of the external vehicle to be constant, and a constant current (CC) mode for adjusting an amount of current flowing between the inner battery pack of the electric vehicle and the inner battery pack of the external vehicle to be constant.

When the power connector of the electric vehicle and the power connector of the external vehicle are connected to each other, the controller may calculate required power of each of the electric vehicle and the external vehicle and use at least one of a driving distance of each of the electric vehicle and the external vehicle, a destination of each of the electric vehicle and the external vehicle, and information about a charging station located on a path from a current position to the destination of each of the electric vehicle and the external vehicle to calculate the required power, and control a vehicle having a relatively high required power to be charged and a vehicle having a relatively low required power to be discharged, of the electric vehicle and the external vehicle.

According to another aspect of the present inventive concept, there is provided a method of performing charging in an electric vehicle, the electric vehicle comprising a power connector transmitting and receiving electric power with respect to an external vehicle, a communication connector performing communication with the external vehicle, and a DC/DC converter used for charging or discharging a battery pack, which includes determining whether the power connector of the electric vehicle and a power connector of the external vehicle are connected to each other based on a high voltage interlock (HVIL) signal, which is performed by a controller, identifying one of the two power connectors connected to each other to be a transmissive power connector and the other one to be a receiving power connector, based on the HVIL signal, which is performed by the controller, performing charging by using the DC/DC converter in a vehicle having a power connector identified to be the receiving power connector, preventing an inrush current during charging, which is performed by a charging relay, and displaying a charging progress, which is performed by a display, in which charging is performed in the performing of charging when the electric vehicle and the external vehicle drive at same speed when the power connector of the electric vehicle and the power connector of the external vehicle are connected to each other.

According to another aspect of the present inventive concept, there is provided a power supply apparatus, which includes an inner battery connected to a power connector, a first converter connected to the inner battery and supplying electric power to an apparatus where the inner battery is arranged, a second converter connected to the power connector and charging the inner battery, a transmissive power connector connected to the second converter and providing an interface supplying electric power to an external battery installed on an external apparatus through discharging by the inner battery, a communication connector performing data communication between the inner battery and the external battery, and a controller controlling operations of the first converter and the second converter, in which the controller provides a control interface for controlling charging between the inner battery and the external battery, and the control interface provides at least one of a state of charge (SoC) mode for adjusting a charging state of the inner battery or the external battery, a constant voltage (CV) mode for adjusting a voltage difference between the inner battery and the external battery to be constant, and a constant current (CC) mode for adjusting an amount of current flowing between the inner battery and the external battery to be constant.

Advantageous Effects

According to an embodiment of the prevent inventive concept, an electric vehicle and another vehicle may reciprocally supply electricity so as to charge each other regardless of time and place. Thus, the reliability of energy supply to an electric vehicle may be improved.

BEST MODE

The present inventive concept will now be described more fully with reference to the accompanying drawings, in which embodiments of the inventive concept are shown. In the following description, when detailed descriptions about related well-known functions or structures are determined to make the gist of the present inventive concept unclear, the detailed descriptions will be omitted herein.

Also, the present specification and drawings are not provided to limit the scope of the present inventive concept, which should be determined based on the scope of the claims. Terms used in the present specification are used for explaining a specific embodiment, not for limiting the present inventive concept.

Figure 1:
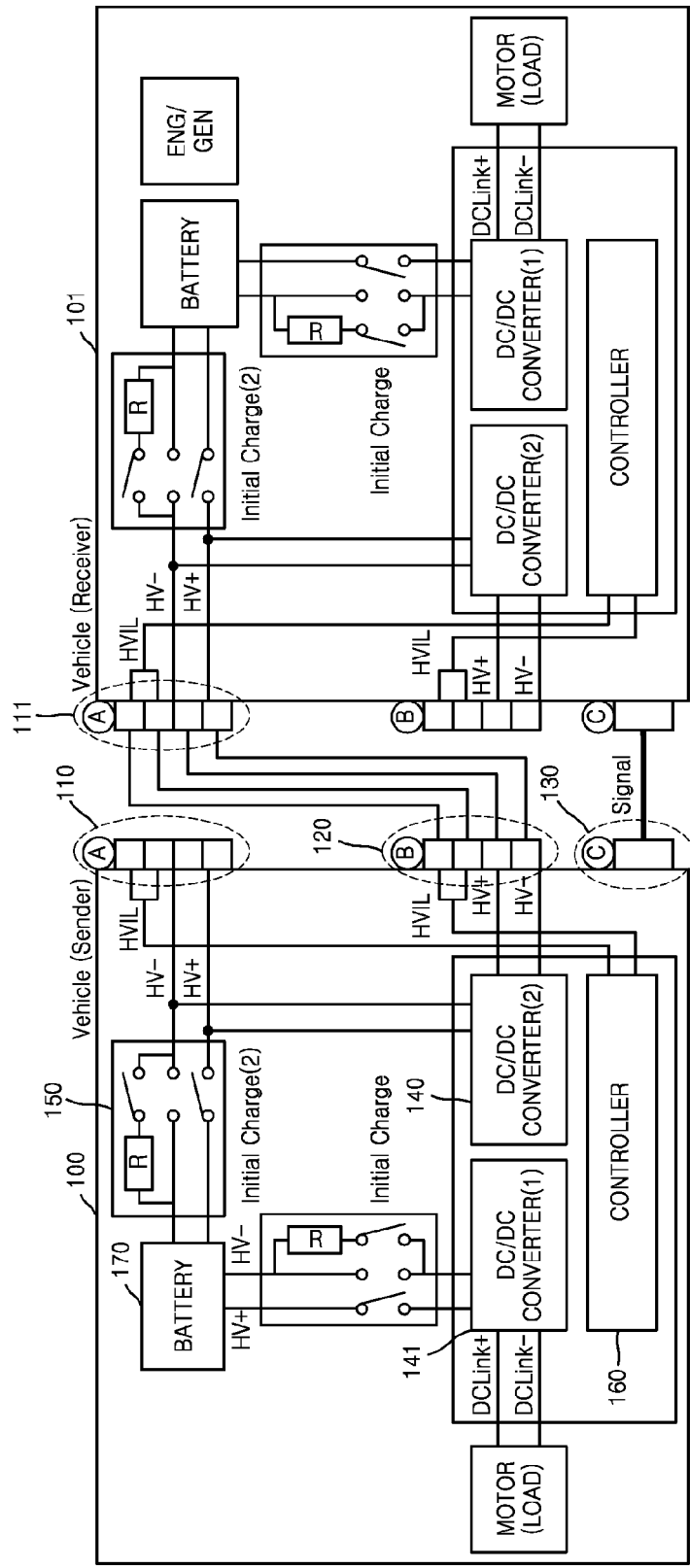
FIGS. 1 and 2 illustrate internal structures of electric vehicles according to embodiments of the present inventive concept.
Figure 2:
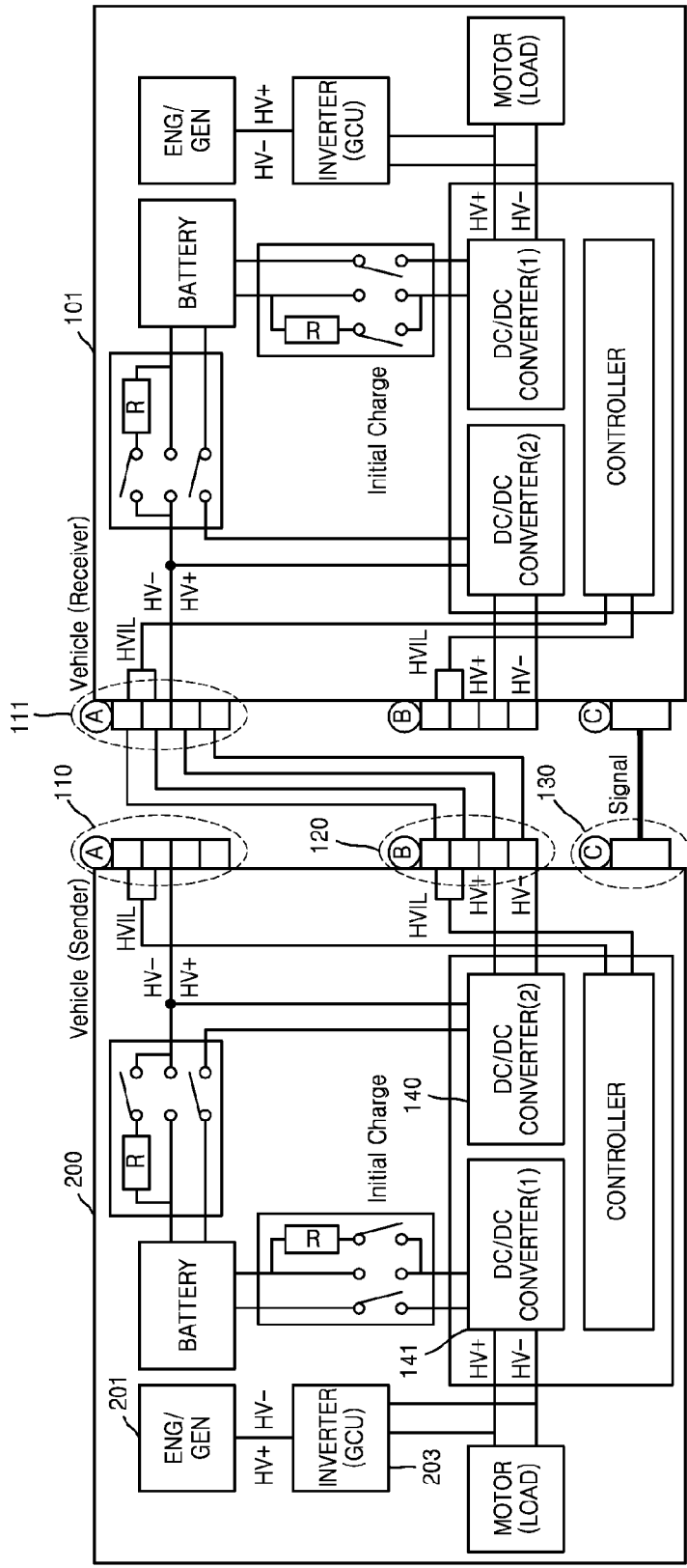

FIGS. 1 and 2 illustrate internal structures of electric vehicles 100 and 200 according to embodiments of the present inventive concept. The electric vehicles 100 and 200 may include electric vehicles (EV), hybrid electric vehicles (HEV), plug-in hybrid electric vehicles (PHEVs).

Each of the electric vehicles 100 and 200 may include power connectors 110 and 120, a communication connector 130, DC/DC converters 140 and 141, a charging relay 150, a controller 160, and an inner battery pack 170, In an embodiment of the present inventive concept, the electric vehicle 100 may supply electric power to an external vehicle 101 or receive electric power from the external vehicle 101.

Figure 6:
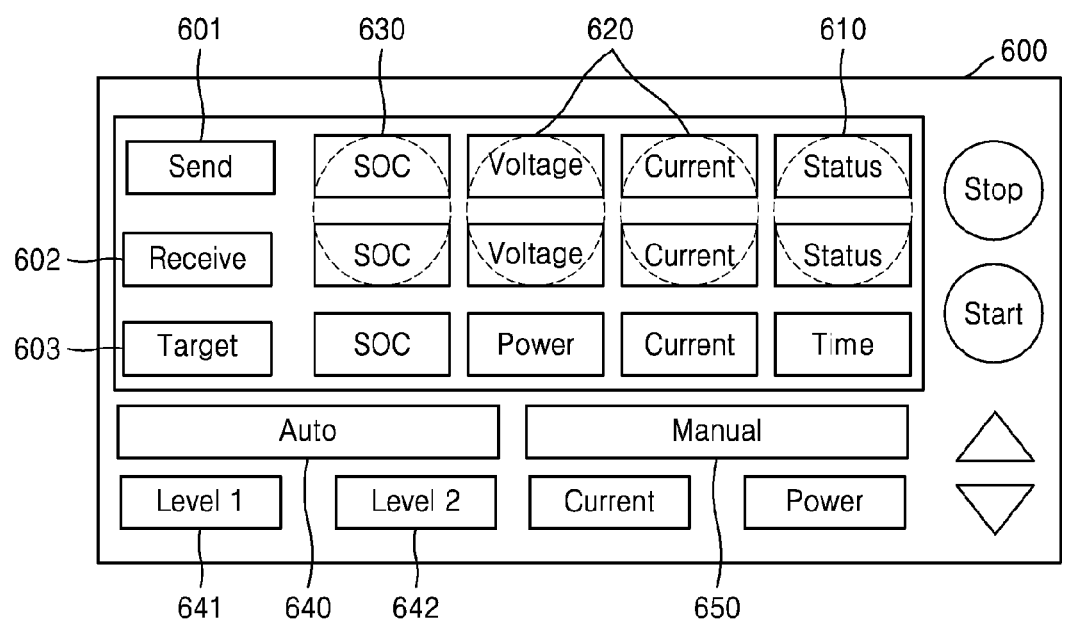
FIG. 6 illustrates a display providing a control interface to display a charging or discharging state so that a user may control the charging or discharging state, according to an embodiment of the present inventive concept.

When the electric vehicle 100 and the external vehicle 101 are connected to each other through an electric connector, the controller 160 controls whether the DC/DC converter 140 may perform charging or discharging and displays a charging progress on a display (see FIG. 6).

In another embodiment of the present inventive concept, when the power connector 120 of the electric vehicle 100 and a power connector 111 of the external vehicle 101 are connected to each other, the controller 160 of the electric vehicle 100 produces required power of the electric vehicle 100 or the external vehicle 101. In this case, at least one of a driving distance of each of the electric vehicle 100 and the external vehicle 101, a destination of each of the electric vehicle 100 and the external vehicle 101, and information about a charging station located on a path from a current position to the destination of each of the electric vehicle 100 and the external vehicle 101 is used to produce the required power.

Then, any one of the electric vehicle 100 and the external vehicle 101, which has a relatively high required power, is controlled to be charged, whereas the other one having a relatively low required power is controlled to be discharged.

Also, in an embodiment of the present inventive concept, the electric vehicles 100 and 200 may use in parallel a method of determining a charging mode and a receiving mode by the power connectors 110 and 120 or the communication connector 130, in addition to a method of determining a charging mode and a receiving mode by the controller 160, which is described below.

In an embodiment of the present inventive concept, the electric vehicle 100 prevents rapid and excessive inflow of electric power by using the charging relay 150 in the charging mode in which the DC/DC converter 140 receives electric power or in the discharging mode in which the DC/DC converter 140 supplies electric power, which is described below in detail.

In an embodiment of the present inventive concept, the power connectors 110 and 120 are used to supply electric power to the external vehicle 101 or receive electric power from the external vehicle 101. Also, the power connectors 110 and 120 are implemented to be interactively operable with an existing external charger OBC.

Although FIGS. 1 and 2 illustrate that the power connectors 110 and 120 are separately provided as two connectors, the power connectors 110 and 120 may be implemented to be one incorporated connector. When the power connectors 110 and 120 are implemented to be one incorporated power connector, the power connectors 110 and 120 are implemented to be a transmissive power connector for the charging mode and a receiving power connector for the discharging mode.

The power connectors 110 and 120 illustrated to be two separate connectors in FIGS. 1 and 2 may be respectively implemented to be a transmissive power connector and a receiving power connector.

In an embodiment, when the power connector 120 of the electric vehicle 100, which is a first power connector, is connected to the DC/DC converter 140, which is a second DC/DC converter, and inner battery pack 170 discharges, in other words, electric power is supplied to the external vehicle 101, the power connector 120 of the first electric vehicle 100 is implemented to be a transmissive power connector. In this case, the power connector 111 of the second electric vehicle 101 may be implemented to be a receiving power connector.

In another embodiment, whether the power connector 120 of the first electric vehicle 100 and the power connector 111 of the second electric vehicle 101 are connected to each other may be determined by checking a high voltage interlock (HVIL) connection signal. Accordingly, through the above determination, a transmitting side that supplies electric power and a receiving side that receives electric power may be determined. This method may be used in parallel to a method in which the communication connector 130 is classified into a transmitting side that supplies electric power to a counterpart vehicle and a receiving side that receives electric power from the counterpart vehicle.

The communication connector 130 performs communication with the external vehicle 101. In particular, the communication connector 130 supports a controller area network (CAN) communication or serial communication to enable communication between the inner battery pack 170 of the first electric vehicle 100 and the inner battery pack 170 of the second electric vehicle 101.

In an embodiment, the communication connector 130 supports data exchange between the first electric vehicle 100 and the second electric vehicle 101. When the first electric vehicle 100 performs discharging, the first electric vehicle 100 is assigned with an identification number of "01*101". When the second electric vehicle 101 performs charging, the second electric vehicle 101 is assigned with an identification number of "0*102". Accordingly, the transmitting side that supplies electric power and the receiving side that receives electric power may be distinguished from each other.

When the power connectors 110 and 120 identify the transmitting side and the receiving side by checking the HVIL connection signal, the communication connector 130 receives the above information via the controller 160 and assigns identification numbers to the respective transmitting side's electric vehicle and receiving side's electric vehicle.

The DC/DC converters 140 and 141 are implemented to charge or discharge the battery pack 170. The first DC/DC converter 141 is connected to the battery pack 170 and boosts the electric power of the battery pack 170, and thus, the battery pack 170 supplies electric power to the first electric vehicle 100, in which the battery pack is included.

The second DC/DC converter 140 is implemented to charge or discharge the battery pack 170. In an embodiment, the second DC/DC converter 140 may be modularized by being implemented as a separate controller.

In an embodiment, in the case of the electric drive vehicle (EV) 100 of the electric vehicles, the first DC/DC converter 141 and the second DC/DC converter 140 are installed. In the case of the hybrid electric vehicle 200 of FIG. 2, an inverter 203 for an engine and a generator 201 of FIG. 2 is installed in both of a serial type and a parallel type.

The charging relay 150 may include one resistor and two relays, and prevent an inrush current during charging of the first vehicle 100 and the second vehicle 101. Also, the charging relay 150 may be used for cutting the electric power off. For example, the charging relay 150 may be used to prevent excessive discharging in a vehicle supplying electric power.

Although FIGS. 1 and 2 illustrate an example in which the charging relay 150 and the battery pack 170 are separately implemented, the charging relay 150 and the battery pack 170 may be implemented in an incorporated form. Also, although FIGS. 1 and 2 illustrate an example of an embodiment in which charging or discharging is performed between the electric vehicles, charging or discharging may be performed in the same or similar method between apparatuses having the above-described structures. In this case, the apparatus may be implemented by further including a display, as illustrated in FIG. 6.

In an embodiment, charging or discharging between movable robots having the internal structures of FIGS. 1 and 2, and between a movable robot and an electric vehicle, is available.

In another embodiment, the first electric vehicle 100 and the second electric vehicle 101 may be implemented to be able to perform charging while the first electric vehicle 100 and the second electric vehicle 101 are being driven side by side. In this case, the first electric vehicle 100 and the second electric vehicle 101 may calculate a vehicle speed using a sensor such as resolver or encoder installed on a wheel. Also, the vehicle speed may be calculated by using a navigation device including a global positioning system (GPS).

The first electric vehicle 100 and the second electric vehicle 101 may check a vehicle speed of a counterpart vehicle through near field communication or CAN communication via the communication connector 130. The controller 160 calculates a median value of vehicle speed values of the first electric vehicle 100 and the second electric vehicle 101. When charging or discharging is performed between the first electric vehicle 100 and the second electric vehicle 101, the controller 160 controls a vehicle being driven at a speed faster than the intermediate value decelerates and a vehicle being driven at a speed slower than the intermediate value accelerates. Although an example in which the first electric vehicle 100 and the second electric vehicle 101 are being driven side by side is described above, the above concept may be modified to be applied to a movable robot or a movable object.

In another embodiment, charging is performed while the first electric vehicle 100 and the second electric vehicle 101 are being driven in tandem. In this case, a rear connection apparatus of a preceding vehicle is coupled to a front connection apparatus of a following vehicle and thus a vehicle connection for charging and communication is established.

The power connector 120 of the first electric vehicle 100 and the power connector 111 and the communication connector 130 of the second electric vehicle 101 may be respectively arranged at the rear connection apparatus of the preceding vehicle or the front connection apparatus of the following vehicle.

When charging is performed while the first electric vehicle 100 and the second electric vehicle 101 are being driven end to end, a distance between the preceding vehicle and the following vehicle may be measured through a Lidar or an ultrasound sensor installed at the following vehicle. In this case, the controller 160 calculates the distance between the first electric vehicle 100 and the second electric vehicle 101 in real time so that a certain distance may be maintained between the first electric vehicle 100 and the second electric vehicle 101.

Also, the controller 160 may receive a driving command of the preceding vehicle while performing near field communication through the communication connector 130 to prevent a dangerous situation such as a sudden stop or an emergency stop.

Figure 3:
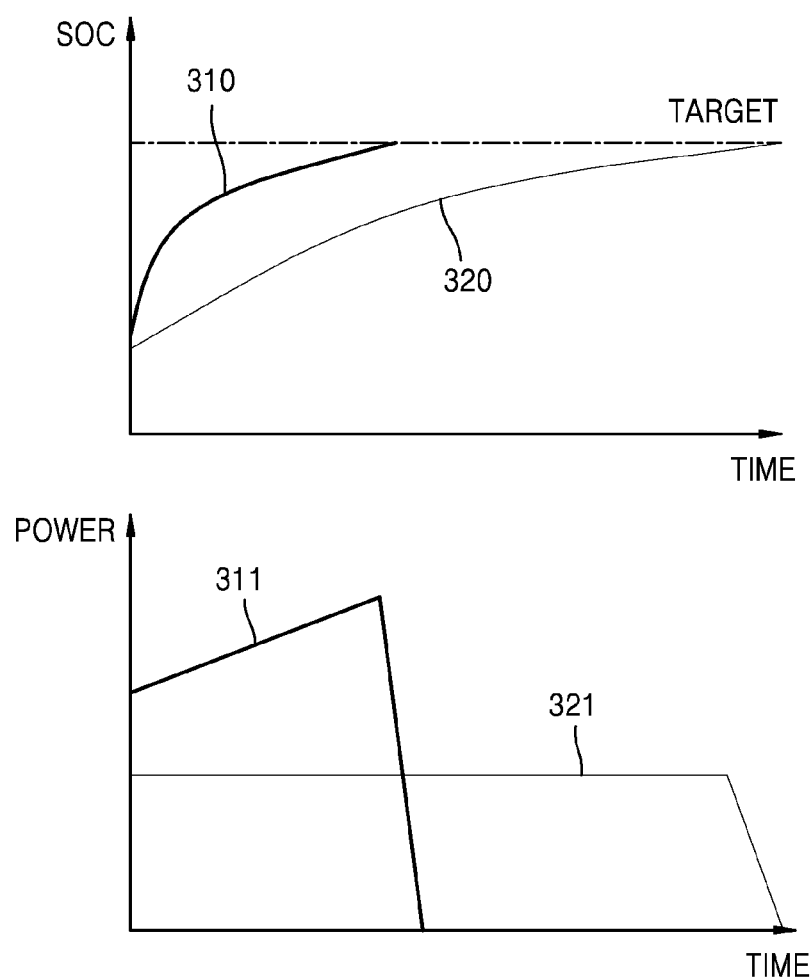
FIG. 3 illustrates concepts of quick charging and slow charging according to an embodiment of the present inventive concept.

FIG. 3 illustrates concepts of quick charging and slow charging according to an embodiment of the present inventive concept.

Quick charging 310 and 311 denotes charging at a high current level. Slow charging denotes performing constant power (CP) charging at an existing commercial charging level of about 3.3 kW.

In the present embodiment, the quick charging 310 and 311 are implemented to quickly reach a state of charge (SOC) by supplying a high current of a continuous charging current level in a short time. After reaching a preset SOC, the quick charging 310 and 311 are controlled, through a constant voltage (CV) control, not to deteriorate cell balancing between the inner battery pack 170 of the first electric vehicle 100 of FIG. 1 and the inner battery pack 170 of the second electric vehicle 101 of FIG. 1.

Figure 4:
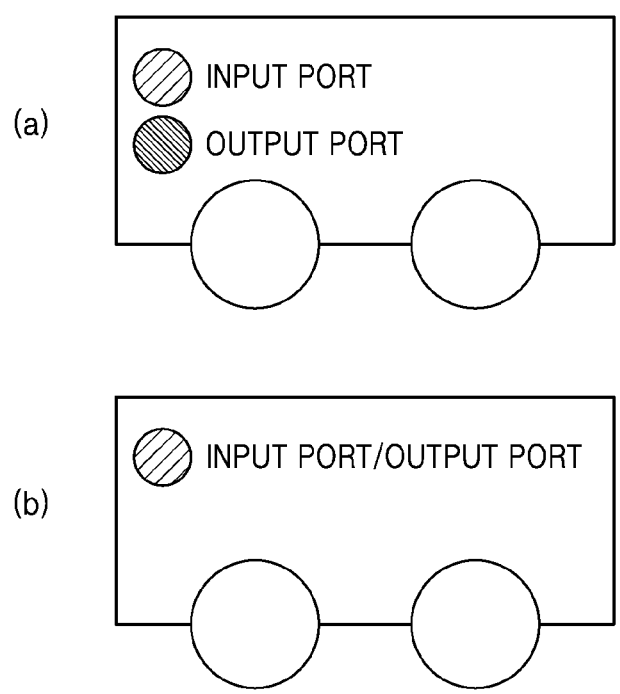
FIGS. 4A and 4B illustrate power connectors classified by an input/output port type, according to an embodiment.

FIGS. 4A and 4B illustrate power connectors classified by an input/output port type, according to an embodiment.

FIG. 4A illustrates an example in which an input power connector and an output power connector are separately provided. In a detailed example, the examples are the embodiments illustrated in FIGS. 1 and 2. FIG. 4B illustrates an example in which an input power connector and an output power connector are provided in an integrated type of an input/output power connector.

Figure 5:
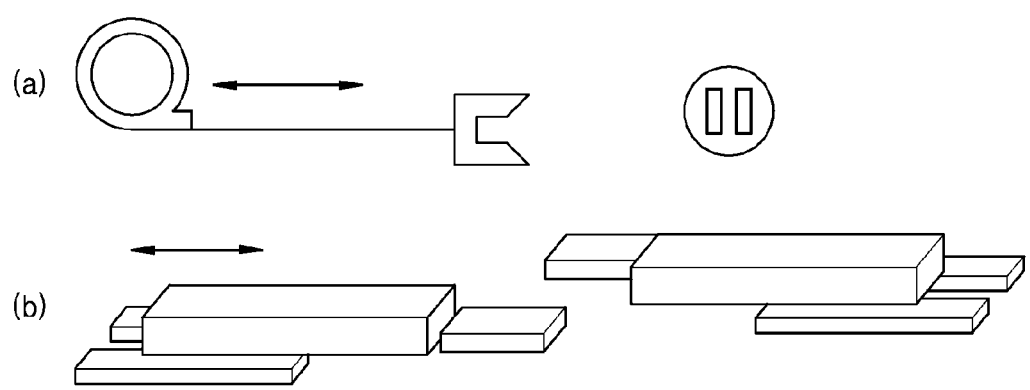
FIGS. 5A and 5B illustrate power connectors classified by an input/output cable type, according to an embodiment.

FIGS. 5A and 5B illustrate power connectors classified by an input/output cable type, according to an embodiment. FIG. 5A illustrates an example in which a power connector is implemented in a reel-type plug cable form. FIG. 5B illustrates an example in which power connectors are connected to each other by a rail-type contact connection apparatus.

FIG. 6 illustrates a display providing a control interface to display a charging or discharging state so that a user may control the charging or discharging state, according to an embodiment of the present inventive concept.

When electric power is supplied and received between the first vehicle and the second vehicle, "Send" and "Target" 601 and 603 may be turned on the display in a vehicle supplying electric power, and "Receive" and "Target" buttons 602 and 603 may be turned on the display in a vehicle receiving electric power.

In the present embodiment, a display 600 supports an interface that may display or control information of "Status" 610 indicating a state of a battery pack of a vehicle, information of "Voltage" and "Current" 620 of each vehicle, and information of "SOC" 630 indicating a current state.

Also, the display 600 displays a message such as a warning or error so that a user may recognize a state of a battery pack. Also, the display 600 supports a control interface to start or stop charging or discharging.

In addition, the display 600 supports a control signal to select or control an automatic charging mode 640 or a manual charging mode 650. The automatic charging mode 640 may be implemented to provide a mode select menu to select a slow charging "Level 1" 641 and quick charging "Level 2" 642. In the manual charging mode 650, a control interface, through which the user may adjust a charging or discharging level, is provided.

In another embodiment, the display 600 may be implemented to support a control interface of a SoC mode for adjusting a charging state of an inner battery of a first apparatus or an inner battery of a second apparatus through the control interface, a CV mode for adjusting a voltage difference between the inner battery of the first apparatus and the inner battery of the second apparatus to be constant, and a constant current (CC) mode for adjusting an amount of current flowing between the inner battery of the first apparatus and the inner battery of the second apparatus to be constant. In the present specification, the inner battery of an external vehicle and an external battery are used to have substantially the same meaning.

Figure 7:
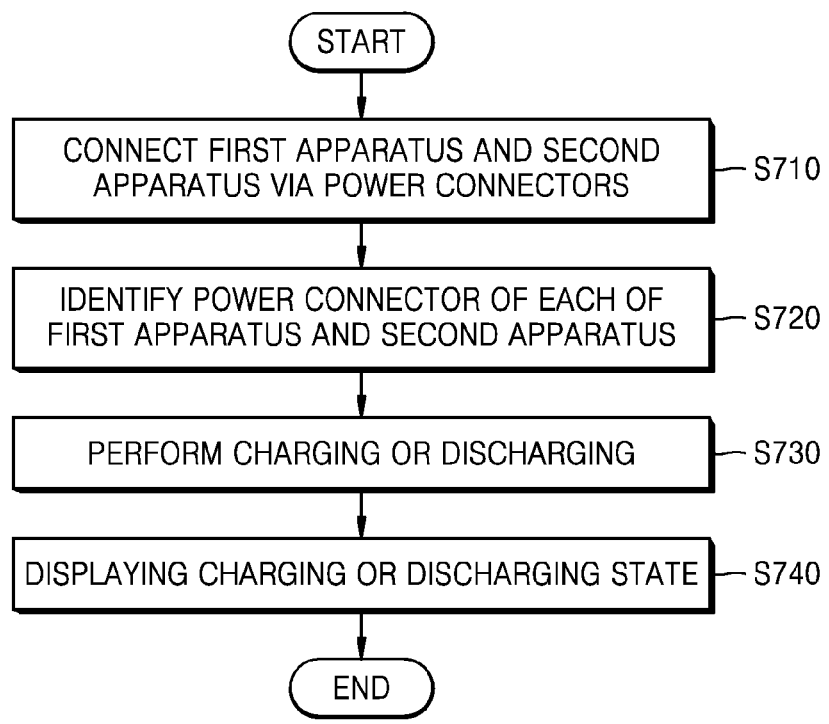
FIG. 7 is a flowchart of a method of reciprocally supplying electricity between a first apparatus and a second apparatus, according to an embodiment of the present inventive concept.

FIG. 7 is a flowchart of a method of reciprocally supplying electricity between the first apparatus and the second apparatus, according to an embodiment of the present inventive concept.

The first apparatus or the second apparatus characteristically has internal structures that are substantially the same as or similar to the internal structures illustrated in FIGS. 1 and 2.

The first apparatus and the second apparatus are connected to each other via the power connectors. Whether the first apparatus and the second apparatus are connected to each other may be determined by the controller based on the HVIL signal. In another embodiment, the communication connector may determine whether the first apparatus and the second apparatus are connected to each other through data communication (S710).

Next, the controllers of the first apparatus and the second apparatus may determine the modes of the first apparatus and the second apparatus to be a charging mode or a discharging mode (S720). A method of determining a charging mode or a discharging mode includes a case in which the controller uses the HVIL signal or a case in which required power is calculated and one having high required power is determined to be in the charging mode.

When each of the first apparatus and the second apparatus is determined to be in the charging mode or the discharging mode, each of the power connector of the first apparatus and the power connector of the second apparatus may be determined to be a transmissive power connector or a receiving power connector (S720)

In the present embodiment, even when the first apparatus and the second apparatus move at the same speed, if the first apparatus and the second apparatus are connected via the power connectors, charging or discharging is available.

When the charging mode and the discharging mode are determined as described above, charging or discharging is performed (S730). A state in which charging or discharging is performed may be displayed on the display as illustrated in FIG. 6 (S740).

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

The invention claimed is:

1. An electric vehicle for mutually supplying electricity with respect to an external vehicle, the electric vehicle comprising:
a power connector supplying electricity to the external vehicle or receiving electricity from the external vehicle;
a communication connector performing communication with the external vehicle;
a DC/DC converter performing charging or discharging an inner battery pack;
a charging relay preventing an inrush current during charging;
a controller controlling whether the DC/DC converter performs charging or discharging, when the power connector of the electric vehicle is connected to a power connector of the external vehicle; and
a display displaying a charging progress,
wherein, when charging or discharging is performed between the electric vehicle and the external vehicle which drive end to end, maintaining a state in which the power connector of the electric vehicle is connected to the power connector of the external vehicle, the controller calculates in real time a distance between the electric vehicle and the external vehicle so as to control the distance between the electric vehicle and the external vehicle to be maintained constant.

2. The electric vehicle of claim 1, wherein the external vehicle is a preceding vehicle and the electric vehicle a following vehicle, and
wherein the power connector of the electric vehicle is located at a front end of the electric vehicle and is connected to the power connector of the external vehicle located at a rear end of the external vehicle.

3. The electric vehicle of claim 1, wherein the controller provides, on the display, a control interface for controlling charging with the external vehicle, and the control interface provides at least one of a state of charge (SoC) mode for adjusting a charging state of the external vehicle; a constant voltage (CV) mode for adjusting a voltage difference between an inner battery pack of the electric vehicle and an inner battery pack of the external vehicle to be constant, and a constant current (CC) mode for adjusting an amount of current flowing between the inner battery pack of the electric vehicle and the inner battery pack of the external vehicle to be constant.

4. An electric vehicle for mutually supplying electricity with respect to an external vehicle, the electric vehicle comprising:
a power connector supplying electricity to the external vehicle or receiving electricity from the external vehicle;
a communication connector performing communication with the external vehicle;
a DC/DC converter performing charging or discharging of an inner battery pack;
a charging relay preventing an inrush current during charging;
a controller controlling whether the DC/DC converter performs charging or discharging, when the power connector of the electric vehicle is connected to a power connector of the external vehicle; and
a display displaying a charging progress,
wherein, when charging or discharging is performed between the electric vehicle and the external vehicle which drive side by side, maintaining a state in which the power connector of the electric vehicle is connected to the power connector of the external vehicle, the controller calculates an intermediate value of a speed of the electric vehicle and a speed of the external vehicle and then controls a faster vehicle between the electric vehicle and the external vehicle to be decelerated and a slower vehicle between the electric vehicle and the external vehicle to be accelerated.

5. The electric vehicle of claim 4, wherein the electric vehicle calculates a vehicle speed through a sensor installed on a wheel or a navigation device including a global positioning system (GPS), and the sensor installed on the wheel comprises a resolver or an encoder.

6. The electric vehicle of claim 4, wherein the electric vehicle and the external vehicle check vehicle speeds of each other through near field communication or controller area network (CAN) communication.

7. The electric vehicle of claim 4, wherein the controller provides, on the display, a control interface for controlling charging with the external vehicle, and the control interface provides at least one of a state of charge (SoC) mode for adjusting a charging state of the external vehicle; a constant voltage (CV) mode for adjusting a voltage difference between an inner battery pack of the electric vehicle and an inner battery pack of the external vehicle to be constant, and a constant current (CC) mode for adjusting a current flowing between the inner battery pack of the electric vehicle and the inner battery pack of the external vehicle to be constant.

8. An electric vehicle for mutually supplying electricity with respect to an external vehicle, the electric vehicle comprising:
a power connector supplying electricity to the external vehicle or receiving electricity from the external vehicle;
a communication connector performing communication with the external vehicle;
a DC/DC converter performing charging or discharging of an inner battery pack;

a charging relay preventing an inrush current during charging;

a controller controlling whether the DC/DC converter performs charging or discharging, when the power connector of the electric vehicle is connected to a power connector of the external vehicle; and a display displaying a charging progress, wherein charging or discharging is performed between the electric vehicle and the external vehicle, which drive at a same speed, maintaining a state in which the power connector of the electric vehicle is connected to the power connector of the external vehicle.

9. The electric vehicle of claim 8, wherein the controller provides, on the display, a control interface for controlling charging with the external vehicle, and the control interface provides at least one of a state of charge (SoC) mode for adjusting a charging state of the external vehicle, a constant voltage (CV) mode for adjusting a voltage difference between an inner battery pack of the electric vehicle and an inner battery pack of the external vehicle to be constant, and a constant current (CC) mode for adjusting an amount of current flowing between the inner battery pack of the electric vehicle and the inner battery pack of the external vehicle to be constant.

10. The electric vehicle of claim 8, wherein, when the power connector of the electric vehicle and the power connector of the external vehicle are connected to each other, the controller calculates required power of each of the electric vehicle and the external vehicle and uses at least one of a driving distance of each of the electric vehicle and the external vehicle, a destination of each of the electric vehicle and the external vehicle, and information about a charging station located on a path from a current position to the destination of each of the electric vehicle and the external vehicle to calculate the required power, and controls a vehicle having a relatively high required power to be charged and a vehicle having a relatively low required power to be discharged, of the electric vehicle and the external vehicle.

11. The electric vehicle of claim 8, wherein the power connector is provided in a transmissive power connector or a receiving power connector in the electric vehicle.

12. The electric vehicle of claim 8, wherein the external vehicle comprises an electric vehicle (EV), a hybrid electric vehicle (HEV), a plug-in hybrid electric vehicle (PHEV).

13. The electric vehicle of claim 8, wherein the communication connector supports controller area network (CAN) communication or serial communication.

14. The electric vehicle of claim 8, wherein the controller determines whether the power connector of the electric vehicle is connected to the power connector of the external vehicle, based on a high voltage interlock (HVIL) signal, and identifies each of the power connector of the electric vehicle and the power connector of the external vehicle as a transmissive power connector or a receiving power connector, based on the HVIL signal.

15. A method of performing charging in an electric vehicle, the electric vehicle comprising a power connector transmitting and receiving electric power with respect to an external vehicle, a communication connector performing communication with the external vehicle, and a DC/DC converter used for charging or discharging a battery pack, the method comprising:

determining whether the power connector of the electric vehicle and a power connector of the external vehicle are connected to each other based on a high voltage interlock (HVIL) signal, which is performed by a controller;

identifying each of the power connector of the electric vehicle and the power connector of the external vehicle as a transmissive power connector or a receiving power connector, based on the HVIL signal, which is performed by the controller;

performing charging by using the DC/DC converter in a vehicle having a power connector identified to be the receiving power connector;

preventing an inrush current during charging, which is performed by a charging relay; and displaying a charging progress, which is performed by a display, wherein charging is performed in the performing of charging when the electric vehicle and the external vehicle drive at a same speed when the power connector of the electric vehicle and the power connector of the external vehicle are connected to each other.

16. The method of claim 15, wherein, in the identifying of each of the power connector of the electric vehicle and the power connector of the external vehicle, when the power connector of the electric vehicle and the power connector of the external vehicle are connected to each other, the controller calculates required power of each of the electric vehicle and the external vehicle in addition to the HVIL signal.

17. The method of claim 16, wherein at least one of a driving distance of each of the electric vehicle and the external vehicle, a destination of each of the electric vehicle and the external vehicle, and information about a charging station located on a path from a current position to the destination of each of the electric vehicle and the external vehicle is used to calculate the required power.

18. The method of claim 15, wherein the external vehicle comprises an electric vehicle (EV), a hybrid electric vehicle (HEV), a plug-in hybrid electric vehicle (PHEV).

19. The method of claim 15, wherein the communication connector supports controller area network (CAN) communication or serial communication.

20. A method of performing charging in an electric vehicle, the electric vehicle comprising a power connector transmitting and receiving electric power with respect to an external vehicle, a communication connector performing communication with the external vehicle, and a DC/DC converter used for charging or discharging a battery pack, the method comprising:

determining whether the power connector of the electric vehicle and a power connector of the external vehicle are connected to each other based on a high voltage interlock (HVIL) signal, which is performed by a controller;

identifying each of the power connector of the electric vehicle and the power connector of the external vehicle as a transmissive power connector or a receiving power connector, based on the HVIL signal, which is performed by the controller;

performing charging by using the DC/DC converter if the power connector of the electric vehicle is identified to be the receiving power connector, and performing discharging by using the DC/DC converter if the power connector of the electric vehicle is identified to be the transmissive power connector;

preventing an inrush current during charging, which is performed by a charging relay of the electric vehicle; and displaying a charging progress, which is performed by a display of the electric vehicle.

* * * * *